(12) United States Patent
Wang (10) Patent No.: US 8,517,655 B2
(45) Date of Patent: Aug. 27, 2013

(54) LOCKING WEDGE SYSTEM

(76) Inventor: Dong Bing Wang, Mississauga (CA)

( * ) Notice: Subject to any disclaimer, the term of this patent is extended or adjusted under 35 U.S.C. 154(b) by 322 days.

(21) Appl. No.: 12/923,674

(22) Filed: Oct. 1, 2010

(65) Prior Publication Data

US 2012/0082528 A1    Apr. 5, 2012

(51) Int. Cl.
*F16B 43/00*    (2006.01)

(52) U.S. Cl.
USPC .......................... 411/535; 411/531; 411/538

(58) Field of Classification Search
USPC ................. 411/531, 534, 535, 538, 548, 533
See application file for complete search history.

(56) References Cited

U.S. PATENT DOCUMENTS

| | | | | |
|---|---|---|---|---|
| 385,845 | A | * | 7/1888 | Cobb ............................... 82/161 |
| 427,887 | A | * | 5/1890 | Muir ............................... 411/535 |
| 774,042 | A | * | 11/1904 | Cooper ........................... 301/132 |
| 1,668,169 | A | | 5/1928 | Palmer |
| 2,120,462 | A | | 6/1938 | Ferguson |
| 2,581,217 | A | * | 1/1952 | Terry ............................. 411/152 |
| 2,665,729 | A | * | 1/1954 | Terry ............................. 411/152 |
| 3,216,475 | A | | 11/1965 | Jacobsen |
| 3,285,568 | A | * | 11/1966 | Biach ........................... 254/29 A |
| 3,494,399 | A | | 2/1970 | Heighberger |
| 3,902,209 | A | | 9/1975 | Gohs |
| 4,073,329 | A | | 2/1978 | Hala |
| 4,134,438 | A | | 1/1979 | Frieberg et al. |
| 4,377,361 | A | | 3/1983 | Frieberg |
| 4,510,693 | A | | 4/1985 | Cusack |
| 4,958,970 | A | * | 9/1990 | Rose et al. ....................... 411/12 |
| 5,090,855 | A | | 2/1992 | Terry |
| 5,100,274 | A | | 3/1992 | Hassan et al. |
| 5,158,409 | A | | 10/1992 | Ishida |
| 5,192,142 | A | * | 3/1993 | Hyll ................................ 403/16 |
| 5,290,074 | A | | 3/1994 | Chapman |
| 5,743,496 | A | | 4/1998 | Atkinson, Jr. |

(Continued)

FOREIGN PATENT DOCUMENTS

| | | |
|---|---|---|
| CA | 1101250 | 5/1981 |
| CA | 1260296 | 9/1989 |

(Continued)

OTHER PUBLICATIONS

Portland Bolt & Manufacturing Co., Hardened Beveled Washers, Nov. 9, 2009, 2 pages, Portland, Oregon.

(Continued)

*Primary Examiner* — Roberta Delisle
(74) *Attorney, Agent, or Firm* — Fitch, Even, Tabin & Flannery LLP (57) ABSTRACT

A locking wedge system for use with a load-carrying stud having a locknut (or work piece) mounted on the stud in locking relation with another work piece employs a laterally displaceable laterally tapered wedge member that is forced transversely into axial jacking relation between a pair of tapered washers so as to apply a large axial locking force against the lock nut and work piece. The tapered wedge member is forced into engagement between the pair of tapered washers by way of a transversely extending jacking screw. The jacking screw may pull or push the tapered wedge member into or out of engagement between the pair of tapered washers. A preferred wedge angle from normal to the stud is 3 degrees with an operating range from 1 degree to 10 degrees. The locking wedge system elements are selectively rotatable about the stud, for optimum operating access to the jacking screw.

42 Claims, 5 Drawing Sheets

(56) References Cited

U.S. PATENT DOCUMENTS

| | | | |
|---|---|---|---|
| 6,099,223 A * | 8/2000 | Galis et al. ............... | 411/538 |
| 6,530,715 B1 | 3/2003 | Kraft et al. | |
| 2007/0110542 A1 | 5/2007 | Weimann | |

FOREIGN PATENT DOCUMENTS

| | | |
|---|---|---|
| CA | 1320364 | 7/1993 |
| CA | 2207205 | 12/1998 |
| CA | 2351666 | 6/2000 |
| CA | 2396341 | 1/2004 |
| EP | 0803674 | 10/1997 |
| GB | 16026 | 6/1911 |
| GB | 272807 | 6/1927 |
| GB | 532663 | 1/1941 |
| GB | 763643 | 12/1956 |
| GB | 1043843 | 9/1966 |
| GB | 1248969 | 10/1971 |
| GB | 2393227 | 3/2004 |
| WO | WO/2005/012742 | 2/2005 |

OTHER PUBLICATIONS

Nucor Fastener Division, TRU-Tension Fastening System, 6 pages, St. Joe, Indiana, Feb. 15, 2008.

MTS Systems Corporation, 601.11 Spiral Washers, Eden Prairie, MN, USA, 1 page.

* cited by examiner

LOCKING WEDGE SYSTEM

FIELD OF THE INVENTION

This invention is directed to locking assemblies and in particular locking assemblies for anchoring two members mounted on a threaded stud.

BACKGROUND OF THE INVENTION

A threaded nut or work piece is frequently locked to a threaded stud by applying a second nut or work piece in direct, face-to-face compressive relation against the first nut or work piece, to lock it in place. Traditionally, the two threaded members must be rotated (torqued) against each other in the fastening process, upon the threaded stud. The threaded stud is slightly stretched during this fastening process, in order to generate the required locking force between the locking nut and the work piece. In the case of large diameter threaded assemblies (e.g. 1" diameter or larger) the torque required to produce the desired fastening effect become significant, and in some cases is impractical by standard hand tools. Instruments such as a load-meter, which are required to be locked in place, are unsuited to having such locking torque applied against them, and can be damaged by such torquing action.

In installations where the threaded stud is subjected to a large applied tensile load, the axial locking force at the locking interface must exceed the applied tensile load in order to ensure that the locked condition is maintained. This may require the application of excessive mutually opposed torquing force between the nut and the workpiece. Furthermore, some work pieces may be torque-sensitive and not suited or permitted to be tightened with such excessive torque, for example, such as an inline force transducer (load-meter) located in a load-applying tensile testing apparatus. However, a reliable locking mode is still desirable for these types of assembly.

An adjustable spacer, known as the "MTS 6011.11 Spiral Washers " has previously been used to provide a backlash-free threaded union. The MTS apparatus uses a pair of spirally tapered washers in facing relation, one of which is rotated about its polar axis relative to the other tapered washer, to change the extent of taper interplay, thereby increasing the axial extent of the washers, to take up the extension of a stud or other tensioned member. However, the Spiral Washers are NOT load jacking devices. Four major disadvantages of the MTS system are: (1) External tension force is needed to stretch the stud as the MTS Washers are not usable as a load-applying prime mover; (2) the requirement for special tools in order to rotate one washer relative to the other: (3) the MTS system may require the use of two hands; and (4) in order to access the washers and use the special tools in rotating the washer/washers a significant clear area adjacent the washers is required.

SUMMARY OF THE INVENTION

In the present invention a locking force being applied to an assembly of a first member and a second member, such as two work pieces secured to a tensioned member such as a threaded stud, or such as a work piece and a lock nut both mounted upon a threaded stud, or such as an unthreaded first member supported by an abutment and a threaded second member secured to a threaded stud, is provided by way of a locking wedge system mounted upon the stud in interposed, snugged-up (hand-tightened) relation between the first member and the second member.

The locking assembly has a pair of axially slideable, laterally tapered washers mounted on the stud, with a laterally tapered wedge member in partial laterally withdrawn, taper-face to taper-face relation between the two washers.

To apply locking force to the whole assembly, the tapered wedge member is forced laterally into linear wedging relation with the adjoining two tapered washers by a wedge displacer so as to force the washers apart and thus apply axial loading by the locking wedge system against the adjoining work piece and the securing nut, (or against the two secured work pieces), thereby locally tensioning the stud. A wedge displacer may also be used to force the tapered wedge member out from between the opposing tapered washers. In the claims of this specification the term locking wedge displacer means a wedge displacer for axially loading the stud, the term unlocking wedge displacer means a wedge displacer for axially unloading the stud, and the term wedge displacer means a wedge displacer which can be used to axially load and unload the stud. In various embodiments different wedge displacers may be necessary for loading and unloading the stud and in various embodiments the same wedge displacer may be used to load and unload the stud.

The wedge displacer may comprise an abutment located adjacent the stud and a force transfer element for pulling or pushing the tapered wedge member into increased or decreased engagement with the opposing tapered washers. In various aspects the abutment may be secured or supported by the opposing tapered washers, the first and second members or external parts such as parts of a machine to which the stud is connected, or any combination. In one aspect the force transfer element is a threaded screw also referred to as a jacking screw. In one aspect the abutment has a through bore supporting a threaded jacking screw that extends transversely of the stud and contacts the tapered wedge member in force applying connection, to displace it laterally of the stud in wedging relation between the tapered washers In one aspect the through bore is a clearance bore and the threaded jacking screw extends through the clearance bore in the abutment, to engage a threaded aperture in the tapered wedge member, to enable it to be pulled by rotation of the jacking screw into increased wedging engagement between the tapered washers, with the head of the screw being stabilized by engagement with the outer face of the abutment, adjacent the bore.

In another aspect the through bore is a threaded bore with the threaded jacking screw in threaded relation with the through bore of the abutment, and protrudes therethrough into lateral pushing engagement with the tapered wedging member, to push it into axial wedging relation with the tapered washers.

The tapered wedge member may be retained in-situ by the force applying means. In some cases the locking wedge displacer will need to remain in place to retain the tapered wedge member in axial loading, especially for higher wedge angles. In other cases the tapered wedge member will remain in place after locking wedge member is removed. In these latter cases the tapered wedge member may be able to be released from axial loading by means other than an unlocking wedge displacer but damage to the locking wedge system is unlikely when an unlocking wedge displacer is used. Further, while other prior art tools may be able to release the tapered wedge member from axial loading, prior art tools will not be able to merely reduce axial loading without fully releasing axial loading.

The torque required to rotate the threaded jacking screw in displacing the tapered wedge member laterally in its load applying mode is but a fraction of the torque force required to directly rotate a stud nut or work piece in providing the same stud tension loading as that provided by the locking wedge system.

The subject system enables the adoption of wedging angles that generate sufficient stud stretching, when the tapered wedge member is displaced laterally, without the need to stretch the stud by other means before tightening the locking wedge system.

A further advantage of the subject system is that a significantly greater length of the stud is tensioned by the force-applying process, due to the interposition between the nut and the work piece of the locking wedge system, as compared to the miniscule length of stud involved when the stud-tensioning members (such as a nut and a work piece) are torqued against each other, face-to-face. This greater length of tensioned stud involved with the present invention means that much greater strain energy is stored in the stud, for a given applied axial loading.

Some particular advantages of the present invention include the fact that the wedging action of the subject locking wedge system is a linear displacement, thereby minimizing the requirement for access space about the installation, and that only a low input torque is required to actuate the locking wedge system, which enables the use of an Allen Key™ to turn the threaded screw in applying the locking force to lock up the assembled components. Also, the tapered washers and the tapered wedge member can be selectively rotatably oriented about the stud member prior to lock-up, thereby enabling the locking wedge system to be operated from a selected, extremely limited access location, by the mere insertion and operation of an Allen Key in the wedge actuating screw. In extremely constricted quarters a straight screwdriver may be used, with preference being given to the square-headed Robertson™ rather than the cruciform Phillips™ screw and screwdriver.

In an application of the locking wedge system, such as a tensile testing machine wherein a metal test rod may be inserted in the machine and tensioned to the point of failure, the machine has a load cell mounted to a stud and locked by way of a locking nut or equivalent shoulder abutment, having the present locking wedge system interposed between the load cell and the locking nut or equivalent abutment, thereby avoiding the application of torque to the load cell.

For reliable operation, the locking force applied by the subject locking wedge system to the stud-mounted components needs to exceed the load being applied by the machine to the test piece. This degree of locking force may be readily provided by the locking wedge system in accordance with the present invention.

With the knowledge of the maximum working load value that will be applied to machine, such as a tensile testing machine, then based upon the dimensions of the tension-loaded member, such as a stud, the maximum working stress can be readily calculated. Increasing this maximum working stress value by a 'reserve' factor then gives the desired locking stress to be exerted by the present locking wedge system. This value can then be readily calculated by any competent Engineer, and converted into a desired wedge angle necessary to achieve the desired result.

The application of friction-diminishing coatings such as Teflon™ to the interacting wedge faces will then reduce the torque loading that is required to operate the subject locking device.

A prototype locking wedge system was designed and made based on the following Calculations and design specifications with the pair of opposing tapered washers and cooperating tapered wedge member having a three (3°) degree taper:

| | |
|---|---|
| Stud tension force target | $Fc = 25,000$ lb |
| Tapered wedge member angle | $A = 3°$ per side |
| Stud effective length in tension | $L = 4.5$ in |
| Threaded stud size | 1¼"-12 SAE thread |
| Lateral clamp screw size: | 7/16"-20 Grade 8 socket head screw |

The following parameters are known:

| | |
|---|---|
| Young's modulus of steel | $E = 29,000,000$ lb/in$^2$ |
| Stud stress area | $As = 1.0729$ in$^2$ |
| Stud material strength (Grade 5) | $S = 74,000$ lb/in$^2$ |
| Clamp screw specified clamp force | $N = 10,700$ lb |
| Coefficient of friction (lubricated) | $C = 0.16$ |

The following calculations are performed:
Requested stud elongation $$\Delta L = Fc/(EAs) = 25,000/(29,000,000 \times 1.0729) = 0.0008 \text{in/in}$$

Minimum wash lateral travel $$T = \Delta L \, L/(2 \, Sin(A)) = 0.0008 \times 4.5/(2 \times 0.052) = 0.035 \text{in}$$

Requested lateral force to generate target tension $$Fl = 2Fc \, Sin(A) = 2 \times 25,000 \times 0.052 = 2600 \text{lb}.$$

Washer surface frictions under clamp force $$Ff = 2FcC = 2 \times 25,000 \times 0.16 = 8,000 \text{lb}$$

Total request lateral clamp force $$F = Fl + Ff = 2600 + 8000 = 10,600 \text{lb}.$$

The above mentioned prototype washer assembly with 3 degree wedge angles was tested in a mechanical laboratory. With calculated lateral clamp force applied, the target stud tension was obtained. The actual lateral travel of the tapered washer was slightly higher than the calculated value due to simplified calculation of stud geometry. The invention was proved to be working, based on the testing results.

Since the specified 7/16" screw clamp force N is 10,700 lbs, a washer assembly with 3 degree wedge angles will be able to generate the target stud tension of 25,000 lb.

The above example calculations have shown that approximately 75% of lateral clamp force is utilized to overcome surface friction between washers. The application of friction diminishing coatings such as Teflon™ to the interacting wedge faces will then reduce the torque loading that is required to operate the subject locking device.

With the knowledge of the maximum working load value that will be applied to a system, such as a tensile testing machine, the above calculation can be used in any stud sizes with given target stud tension forces by controlling the amount of lateral displacement of the tapered wedge member.

The selected wedge angles must be within a certain range in order to function properly. If the angle is too small, excessive lateral travel of the tapered wedge member will result. Without significantly increasing the compact size of a given size of locking wedge system, at a corresponding cost increase, this may impair support rigidity. Among other things, the tapered faces of the tapered washers and the tapered wedge member will lose significant surface contact area, especially adjacent the tensioned stud, lateral travel is too great. On the other hand when the angle is too large, the required lateral clamp force will be increased to an impractical level. Among other things, the amount of force required to laterally displace the tapered wedge member will eventually approach or exceed the amount of force needed to tension the stud directly. Further, as the wedge angle goes up the size and cost of the jacking screw and corresponding abutment and tapered wedge member, and the locking wedge system as a whole, will increase to impractical levels.

Given the broad range of potential uses of the inventive locking wedge system a useful range of wedge angles would be from one (1) degree to ten (10) degrees, especially if friction reducing coatings are used as the wedge angle increases, as shown by the following calculations (without taking into account anti-friction coatings).

The following are the calculation and design Specification for the locking wedge system with a high preload (20,000 lb) for the pair of opposing washers and cooperating tapered wedge member having a one (1°) degree tapers:

| | |
|---|---|
| Stud tension force target | Fc = 20,000 lb |
| Stud effective length in tension | L = 4 in |
| Tapered wedge member angle | A = 1° per side |
| Threaded stud size | 1-12 SAE thread |
| Lateral clamp screw size: | 7/16"-20 Grade 8 socket head screw |

The following parameters are known:

| | |
|---|---|
| Young's modulus of steel | E = 29,000,000 lb/in$^2$ |
| Stud stress area | As = 0.663 in$^2$ |
| Stud material strength (Grade 5) | S = 85,000 lb/in$^2$ |
| Clamp screw specified clamp force | N = 10,700 lb |
| Coefficient of friction (lubricated) | C = 0.16 |

Calculations:
Requested stud elongation $\Delta L = Fc/(EAs) = 20,000/(29,000,000 \times 0.663) = 0.001 \text{in/in}$ Minimum wash lateral travel $T = \Delta L \, L/(2 \, \text{Sin}(A)) = 0.001 \times 4/(2 \times 0.0175) = 0.114 \text{in}$ Requested lateral force to generate target tension $Fl = 2Fc \, \text{Sin}(A) = 2 \times 20,000 \times 0.0175 = 700 \text{lb.}$ Washer surface frictions under clamp force $Ff = 2FcC = 2 \times 20,000 \times 0.16 = 6,400 \text{lb}$ Total request lateral clamp force $F = Fl + Ff = 600 + 6400 = 7,000 \text{lb.}$ Since the specified 7/16" screw maximum clamp force N is 10,700 lb. a washer assembly with 1 degree wedge angle will be able to generate the target stud tension of 20,000 lb. The requested operation torque on 7/16" screw is about 55 ft-lb.

The following are the calculations and design Specification for the locking wedge system with a high preload (20,000 lb) for the pair of opposing washers and cooperating tapered wedge member having ten (10°) degree tapers:
Design specification:

| | |
|---|---|
| Stud tension force target | Fc = 10,000 lb |
| Stud effective length in tension | L = 5 in (thicker washers) |
| Tapered wedge member angle | A = 10° per side |
| Threaded stud size | 1-12 SAE thread |
| Lateral clamp screw size: | 7/16"-20 Grade 8 socket head screw |

The following parameters are known:

| | |
|---|---|
| Young's modulus of steel | E = 29,000,000 lb/in$^2$ |
| Stud stress area | As = 0.663 in$^2$ |
| Stud material strength (Grade 5) | S = 85,000 lb/in$^2$ |
| Clamp screw specified clamp force | N = 10,700 lb |
| Coefficient of friction (lubricated) | C = 0.16 |

Calculations:
Requested stud elongation $\Delta L = Fc/(EAs) = 10,000/(29,000,000 \times 0.663) = 0.0005 \text{in/in}$ Minimum wash lateral travel $T = \Delta L \, L/(2 \, \text{Sin}(A)) = 0.0005 \times 5/(2 \times 0.174) = 0.007 \text{in}$ Requested lateral force to generate target tension $Fl = 2Fc \, \text{Sin}(A) = 2 \times 10,000 \times 0.174 = 3480 \text{lb.}$ Washer surface frictions under clamp force $Ff = 2FcC = 2 \times 10,000 \times 0.16 = 3,200 \text{lb}$ Total request lateral clamp force $F = Fl + Ff = 3480 + 3200 = 6,680 \text{lb.}$ Since the specified 7/16" screw maximum clamp force N is 10,700 lb, a washer assembly with a ten (10) degree wedge angle will be able to generate the target stud tension of 10,000 lb. The requested operation torque on 7/16" screw is about 53 ft-lb.

On the other hand wedge angles of less than 0.3 degrees or more than 15 degrees will be of little or no use as shown by the following calculations.

The following are the calculations and design Specification for the locking wedge system with a high preload (20,000 lb) for the pair of opposing tapered washers and cooperating tapered wedge member having zero point three (0.3°) degree tapers:

| | |
|---|---|
| Stud tension force target | Fc = 25,000 lb |
| Tapered wedge member angle | A = 0.3° per side |
| Stud effective length in tension | L = 4.5 in |
| Threaded stud size | 1¼"-12 SAE thread |
| Lateral clamp screw size: | 7/16"-20 Grade 8 socket head screw |

The following parameters are known:

| | |
|---|---|
| Young's modulus of steel | E = 29,000,000 lb/in$^2$ |
| Stud stress area | As = 1.0729 in$^2$ |
| Stud material strength (Grade 5) | S = 74,000 lb/in$^2$ |
| Clamp screw specified clamp force | N = 10,700 lb |
| Coefficient of friction (lubricated) | C = 0.16 |

The following calculations are performed:
Requested stud elongation $$\Delta L = Fc/(EAs) = 25{,}000/(29{,}000{,}000 \times 1.0729) = 0.0008 \text{in/in}$$

Minimum wash lateral travel $$T = \Delta L \, L/(2 \sin(A)) = 0.0008 \times 4.5/(2 \times 0.0052) = 0.35 \text{in}$$

Requested lateral force to generate target tension $$Fl = 2Fc \sin(A) = 2 \times 25000 \times 0.0052 = 260 \text{lb}.$$

Washer surface frictions under clamp force $$Ff = 2FcC = 2 \times 25{,}000 \times 0.16 = 8{,}000 \text{lb}$$

Total request lateral clamp force $$F = Fl + Ff = 260 + 8000 = 8{,}260 \text{lb}.$$

The following are the calculations and design Specification for the locking wedge system with a high preload (20,000 lb) for the pair of opposing tapered washers and cooperating tapered wedge member having Fifteen (15°) degree tapers:

| | |
|---|---|
| Stud tension force target | Fc = 25,000 lb |
| Tapered wedge member angle | A = 15° per side |
| Stud effective length in tension | L = 4.5 in |
| Threaded stud size | 1¼"-12 SAE thread |
| Lateral clamp screw size: | 7/16"-20 Grade 8 socket head screw |

The following parameters are known:

| | |
|---|---|
| Young's modulus of steel | E = 29,000,000 lb/in$^2$ |
| Stud stress area | As = 1.0729 in$^2$ |
| Stud material strength (Grade 5) | S = 74,000 lb/in$^2$ |
| Clamp screw specified clamp force | N = 10,700 lb |
| Coefficient of friction (lubricated) | C = 0.16 |

The following calculations are performed:
Requested stud elongation $$\Delta L = Fc/(EAs) = 25{,}000/(29{,}000{,}000 \times 1.0729) = 0.0008 \text{in/in}$$

Minimum wash lateral travel $$T = \Delta L \, L/(2 \sin(A)) = 0.0008 \times 4.5/(2 \times 0.259) = 0.007 \text{in}$$

Requested lateral force to generate target tension $$Fl = 2Fc \sin(A) = 2 \times 25{,}000 \times 0.259 = 12{,}950 \text{lb}.$$

Washer surface frictions under clamp force $$Ff = 2FcC = 2 \times 25{,}000 \times 0.16 = 8{,}000 \text{lb}$$

Total request lateral clamp force $$F = Fl + Ff = 12{,}950 + 8{,}000 = 20{,}950 \text{lb}.$$

Those skilled in the art will be able to determine useful wedge angles for any given application.

The various elements of an apparatus such as a tensile testing machine may involve the use of a number of the subject locking mechanisms, interposed between elements of the mechanism.

The invention therefore includes a locking wedge system for locking a first member to a second member in axially fixed spaced relation along a stud, at least the first member threadedly mounted on the stud, the system comprising a pair of laterally tapered washers, each having a laterally tapered inner face facing the other tapered washer for mounting in axially displaceable relation on the stud between the first member and the second member, a laterally tapered wedge member, having opposing tapered faces, for mounting on the stud between the pair of tapered washers, each of the opposing tapered faces for slidably engaging the inner face of one of the two tapered washers, the tapered wedge member being laterally displaceable relative to the stud and to the tapered washers, and a locking wedge displacer for laterally displacing the tapered wedge member from an unlocked position wherein the stud is not axially tensioned to a locked position wherein the stud is axially tensioned.

In one aspect of the locking wedge system the locking wedge displacer pulls the tapered wedge member between the pair of tapered washers for increasing the axial tension on the stud. In one aspect of the locking wedge system the locking wedge displacer pushes the tapered wedge member between the pair of tapered washers for increasing the axial tension on the stud. In one aspect the locking wedge system further comprises an unlocking wedge displacer for laterally displacing the tapered wedge member from a locked position wherein the stud is axially tensioned to an unlocked position wherein the stud is not axially tensioned. In one aspect of the locking wedge system the unlocking wedge displacer pulls the tapered wedge member out from between the pair of tapered washers for decreasing or releasing the axial tension on the stud. In one aspect of the locking wedge system the unlocking wedge displacer pushes the tapered wedge member out from between the pair of tapered washers for decreasing or releasing the axial tension on the stud.

In one aspect of the locking wedge system the locking wedge displacer and the unlocking wedge displacer comprise one wedge displacer. In one aspect of the locking wedge system the wedge displacer comprises an abutment, the abutment for supporting a force transfer element for engaging the tapered wedge member for laterally displacing the tapered wedge member. In one aspect of the locking wedge system the force transfer element is a threaded screw. In one aspect of the locking wedge system the abutment is secured by the pair of tapered washers. In one aspect of the locking wedge system each tapered washer comprises a shouldered recess for receiving the abutment, the abutment further comprising corresponding shoulders. In one aspect of the locking wedge system the threaded screw is rotatably secured to the tapered wedge member and the threaded screw threadedly engages the abutment for moving the tapered wedge member in between and out from between the tapered washers in unison with the threaded screw.

In another aspect of the locking wedge system locking wedge displacer comprises an abutment and a threaded screw, the abutment for rotatably supporting the threaded screw and the threaded screw for engaging the tapered wedge member. In one aspect of the locking wedge system a thinner end of the tapered wedge member comprises a lateral threaded locking aperture for engaging the threaded screw. In another aspect of the locking wedge system the unlocking wedge displacer comprises an abutment and a threaded screw, the abutment for rotatably supporting the threaded screw and the threaded screw for engaging the tapered wedge member. In one aspect of the locking wedge system a thicker end of the tapered wedge member comprises a lateral threaded unlocking aperture for engaging the threaded screw. In one aspect the locking wedge system further comprises a clearance bore in a bridge portion of the abutment through which the threaded screw extends, the threaded screw having an enlarged head supported by the bridge portion of the abutment. In one aspect of the locking wedge system the abutment is supported by the pair of tapered washers. In one aspect of the locking wedge system each of the pair of tapered washers comprises a recess for locating the abutment.

In another aspect of the locking wedge system the locking wedge displacer comprises an abutment and a threaded screw, the abutment for rotatably supporting the threaded screw and the threaded screw for engaging a thicker end of the tapered wedge member. In one aspect of the locking wedge system a thicker end face of the tapered wedge member comprises a centering recess for engaging a tip of the threaded screw. In one aspect of the locking wedge system the unlocking wedge displacer comprises an abutment and a threaded screw, the abutment for rotatably supporting the threaded screw and the threaded screw for engaging a thinner end of the tapered wedge member. In one aspect of the locking wedge system a thinner end face of the tapered wedge member comprises a centering recess for engaging a tip of the threaded screw. In one aspect of the locking wedge system the abutment has a threaded bore through which the threaded screw is threadedly engaged. In one aspect of the locking wedge system the abutment is secured by the pair of tapered washers. In one aspect of the locking wedge system each of the pair of tapered washers comprises a recess for locating the abutment. In one aspect of the locking wedge system the recess comprises a shouldered recess for receiving corresponding shoulders on the abutment.

The invention also includes a locking wedge system for locking a first member to a second member in axially fixed spaced relation along a stud, at least the first member threadedly mounted on the stud, the system comprising a pair of laterally tapered washers, each tapered washer having an inner face, mounted in axially displaceable relation on the stud between the first member and the second member, a laterally tapered wedge member, having opposing tapered faces, mounted on the stud between the pair of tapered washers, each of the opposing tapered faces for slidably engaging the inner face of one of the two tapered washers, the tapered wedge member being laterally displaceable relative to the stud and to the tapered washers, and a wedge displacer for laterally displacing the tapered wedge member from an unlocked position wherein the stud is not axially tensioned to a locked position wherein the stud is axially tensioned and for laterally displacing the tapered wedge member from a locked position wherein the stud is axially tensioned to an unlocked position wherein the stud is not axially tensioned.

In one aspect of the locking wedge system the wedge displacer comprises an abutment, the abutment for supporting a force transfer element for engaging the tapered wedge member for laterally displacing the tapered wedge member. In one aspect of the locking wedge system, the force transfer element is a threaded screw. In one aspect of the locking wedge system the abutment is secured by the pair of tapered washers. In one aspect of the locking wedge system the pair of tapered washers each comprises opposing shouldered recesses for receiving corresponding shoulders on the abutment, the abutment for supporting the threaded screw for locking and unlocking the tapered wedge member. In one aspect of the locking wedge system the abutment has a threaded bore for threadedly engaging the threaded screw, the threaded screw for pushing the tapered wedge member in between and out from between the tapered washers. In one aspect of the locking wedge system the thicker end face and the thinner end face of the tapered wedge member comprise centering recesses for receiving the tip of the threaded screw. In one aspect of the locking wedge system the abutment is supported by the pair of tapered washers and a thinner end of the tapered wedge member comprises a lateral threaded locking aperture for engaging the threaded screw for locking the tapered wedge member and a thicker end of the tapered wedge member comprises a lateral threaded unlocking aperture for engaging the threaded screw for unlocking the tapered wedge member. In one aspect the locking wedge system further comprises a clearance bore in a bridge portion of the abutment through which the threaded screw extends, the threaded screw having an enlarged head supported by the bridge portion of the abutment, the threaded screw for pulling the tapered wedge member in between and out from between the tapered washers.

In another aspect of the locking wedge system one of the opposing tapered faces of the tapered wedge member and the corresponding inner face of one of the two tapered washers slidably engage at a first wedge angle and the other of the opposing tapered faces of the tapered wedge member and the corresponding inner face of the other of the two tapered washers slidably engage at a second wedge angle. In one aspect of the locking wedge system the sum of the first wedge angle and the second wedge angle is between two degrees and twenty degrees. In one aspect of the locking wedge system the first wedge angle is as low as zero degrees and the second wedge angle is as high as twenty degrees. In one aspect of the locking wedge system the first wedge angle and the second wedge angle are an identical wedge angle. In one aspect of the locking wedge system the identical wedge angle is between one and ten degrees. In one aspect of the locking wedge system the identical wedge angle is approximately three degrees.

In another aspect of the locking wedge system the inner face of each of the tapered washers and the opposing tapered faces of the tapered wedge member comprise a friction reducing coating. In one aspect of the locking wedge system the friction reducing coating is TEFLON.

In another aspect of the locking wedge system the tapered washers and the tapered wedge member are selectively rotatable about the stud, to facilitate access to the wedge displacer.

In another aspect of the locking wedge system the second member is threadedly mounted on the stud. In another aspect of the locking wedge system the first member and the second member are workpieces. In another aspect of the locking wedge system one of the first member and the second member is a locknut.

In another aspect of the locking wedge system the abutment is supported by the first member and the second member.

In another aspect of the locking wedge system the threaded screw further comprises means for rotating the threaded screw. In one aspect of the locking wedge system the means for rotating the threaded screw comprise a head. In one aspect of the locking wedge system the head is adapted to receive one of the group consisting of an alien key, a wrench and a screwdriver.

BRIEF DESCRIPTION OF THE SEVERAL VIEWS OF THE DRAWINGS

Certain embodiments of the invention are illustrated, by way of example, without limitation of the invention thereto, other than as set forth in the accompanying claims; it being understood that further embodiments may be understood by one skilled in the art.

Reference is made to the accompanying drawings, wherein.

DETAILED DESCRIPTION OF THE INVENTION

Figure 1:
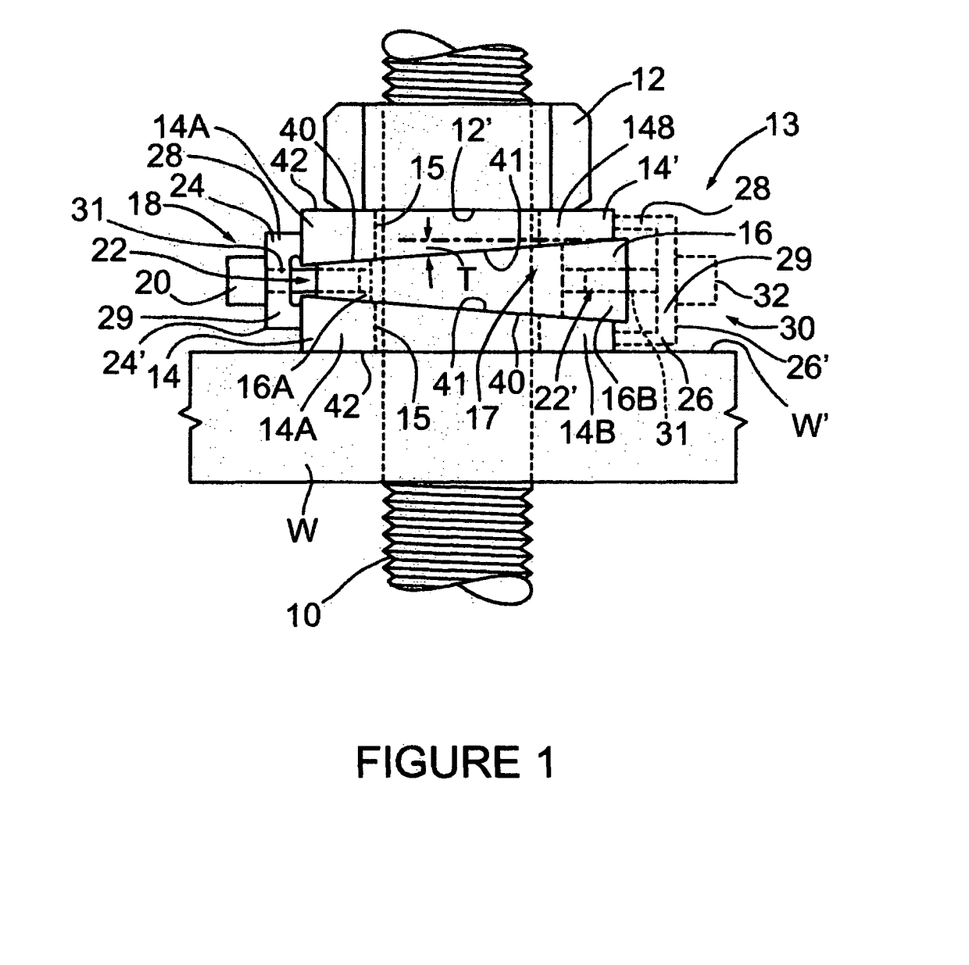
FIG. 1 is a side elevational view of a first embodiment of the locking wedge system.

Referring to FIG. 1, in this first embodiment a threaded workpiece W is threaded onto a threaded stud 10, having a locknut 12 threaded onto the stud 10, in axially spaced relation with the workpiece W. Interposed between the nut 12 and the workpiece W is a subject locking wedge system 13 having a pair of tapered washers 14, 14', each having a washer aperture 15 with a clearance fit for mounting on stud 10. Tapered washers each have an angle of taper T. The inner face 12' of the nut 12 and inner face W' of workpiece W bear against the adjoining outer faces 42, of tapered washers 14, 14'. The washers 14, 14' are separated by a tapered wedge member 16, having opposing faces 40 that each have cooperating angle of taper T, the same as the angle of taper T of the cooperating inner faces of tapered washers 41 of tapered washers 14, 14'. The outer faces of tapered washers 42 of tapered washers 14, 14' are typically, but do not necessarily need to be, normal to the polar axis of the threaded stud 10 and mutually parallel. The tapered wedge member 16 has a thinner end 16A and a thicker end 16B, in accordance with its tapered geometry. Tapered wedge member 16 has an elongated wedge aperture for mounting on stud 10 between thinner end 16A and thicker end 16B.

In one aspect of the invention the wedging force applied by the opposing faces 40 of tapered wedge member 16 against the adjoining tapered inner faces of tapered washers 41 of tapered washers 14, 14' is applied as a laterally directed tensile force, drawing the thinner end 16A of tapered wedge member 16 laterally into wedging relation with tapered washers 14, 14' to cause their mutual separation. The tensile drawing force is applied by a locking jacking screw 18 that is threaded into threaded locking aperture 22 of thinner end 16A of the tapered wedge member 16 through clearance bore 31 in bridge portion 29 in locking pull abutment 24 which straddles thicker ends 14A of tapered washers 14, 14'. Locking pull abutment 24 has an unthreaded clearance bore 31 in bridge portion 29 through which locking jacking screw 18 extends. The locking jacking screw head 20 of locking jacking screw 18 abuts the outer surface 24' of locking pull abutment 24, to secure locking pull abutment 24 in place, and to contain the force generated by locking jacking screw 18 as it is tensioned. Locking pull abutment 24 may have opposing foot portions 28 attached to bridge 29 if required to allow additional lateral travel for tapered wedge member 16.

Shown in phantom in FIG. 1, located diametrically opposite from the locking pull abutment 24, is unlocking jacking screw 30 threadedly engaging threaded unlocking aperture 22' in the thicker end 16B of the tapered wedge member 16. The unlocking jacking screw head 32 of unlocking jacking screw 30 is in engagement with unlocking pull abutment 26 that straddles the thinner ends 14B of tapered washers 14, 14'. Unlocking pull abutment 26 may have opposing foot portions 28 attached to bridge 29 if required to allow additional lateral travel for tapered wedge member 16.

In use, with the locking jacking screw 18 and locking pull abutment 24 removed or loosened, tapered wedge member 16 may be unlocked from tapered washers 14, 14' by unlocking jacking screw 30 and unlocking pull abutment 26 which can be assembled in place as illustrated, with unlocking jacking screw 30 screwed into the thicker end 16B of tapered wedge member 16 through clearance bore 31 in bridge portion 29 of unlocking pull abutment 26 with unlocking pull abutment 26 supported by the thinner ends 14B of tapered washers 14, 14', and then rotating unlocking jacking screw head 32 so as to release the assembled upper lock nut 12 from its load bearing relation with the workpiece W. The unlocking jacking screw head 32 of unlocking jacking screw 30 abuts the outer surface 26' of unlocking pull abutment 26, to secure unlocking pull abutment 26 in place, and to support the force generated by unlocking jacking screw 30 as it is tensioned in the unlocking process.

Figure 2:
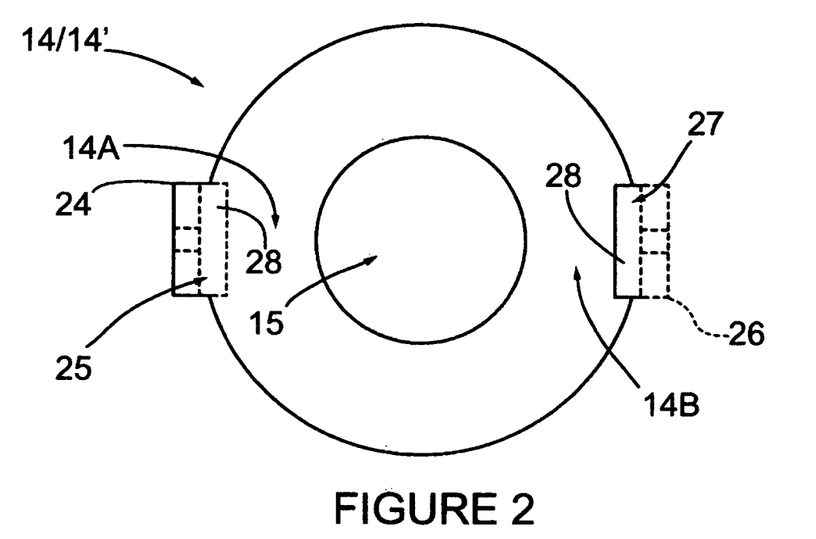
FIG. 2 is a top plan view of the tapered washer of FIG. 1.
Figure 3:
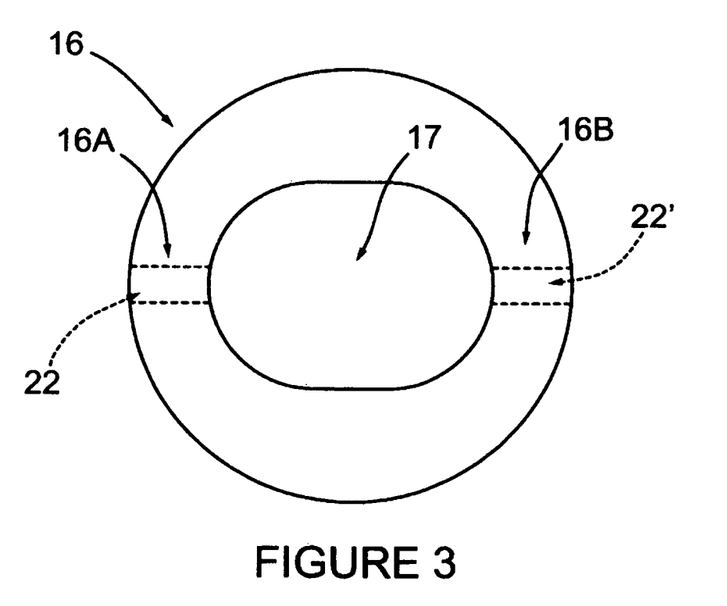
FIG. 3 is a top plan view of the tapered wedge member of FIG. 1.

Referring also to FIGS. 2 and 3, FIG. 2 shows washers 14, 14', each having a washer aperture 15 which has a clearance fit for stud 10 (not shown). Both tapered washers 14, 14' have locking recesses 25, located in the thick ends 14A of tapered washers 14, 14' within which locking recesses 25 foot portions 28 of locking pull abutment 24 are positioned, for stabilizing locking jacking screw 18 when tightening the locking wedge system 13.

The locking pull abutment 24 is held in anchored relation within the locking recesses 25 by the engagement and tightening of locking jacking screw 18 (not shown) into threaded wedge member 16 (not shown). Unlocking recesses 27 in the thinner ends 14B of washers 14, 14' receive foot portions 28 of the unlocking pull abutment 26 (shown in phantom), which straddles tapered washers 14, 14'. The withdrawal jacking screw 30 (illustrated as a separate entity from locking jacking screw 18 for purposes of clarification) is located and secured by the unlocking pull abutment 26 in the same fashion as the locking jacking screw 18, described above.

FIG. 3 shows tapered wedge member 16 having a laterally elongated wedge aperture 17, preferably ovoid for studs with round cross-sections, through which the stud 10 (not shown) extends, the axis of elongation of the ovoid aperture being aligned with the axis of taper of tapered wedge member 16. The thinner end 16A of the tapered wedge member 16 has a lateral threaded locking aperture 22 to receive locking jacking screw 18 in threaded relation therein. The locking jacking screw head 20 of the jacking screw 18 is positioned against the outer surface 24' of locking pull abutment 24 which straddles thicker ends 14A of tapered washers 14, 14' (see FIG. 1), the locking jacking screw 18 extending through a clearance bore 31 in the bridge portion 29 of locking pull abutment 24.

Clockwise rotation of a right-hand threaded locking jacking screw 18 causes the screw 18 to advance into tapered wedge member 16. Due to the axial restraint imposed on locking jacking screw 18 by the locking pull abutment 24, this rotation of the locking jacking screw 18 draws tapered wedge member 16 into deeper wedging relation between tapered washers 14, 14', thereby applying compressive force from tapered washers 14, 14' against the inside face of nut 12' and the inside face of workpiece W'.

This wedging action produces a significantly amplified axial force and reactive force, operating on the nut 12 and the work piece W, acting in a separating sense. This enhanced axial force acting upon nut 12 generates increased frictional engagement of threads of nut 12 with the threads of the stud 10, so as to further resist any tendency for the lock nut 12 to back-off.

Shown in phantom in FIG. 1, an unlocking jacking screw 30 may be inserted into threaded unlocking aperture 22' recessed into the thicker end 16B of tapered wedge member 16. An unlocking pull abutment 26 straddles the thinner ends 14B of tapered washers 14, 14' and stabilizes unlocking jacking screw 30, enabling it to be screwed into tapered wedge member 16. With locking jacking screw 18 backed off, so as to provide a clearance between the head of locking jacking screw 18 and the locking pull abutment 24, the unlocking jacking screw 30 may be tightened up, thereby withdrawing tapered wedge member 16 outwardly (see FIG. 1), to diminish or terminate the jacking action of tapered wedge member 16. With tapered wedge member 16 withdrawn out of wedging action with tapered washers 14, 14', the unloaded stud/nut/workpiece assembly 10/12/W may be readily disassembled.

Figure 4:
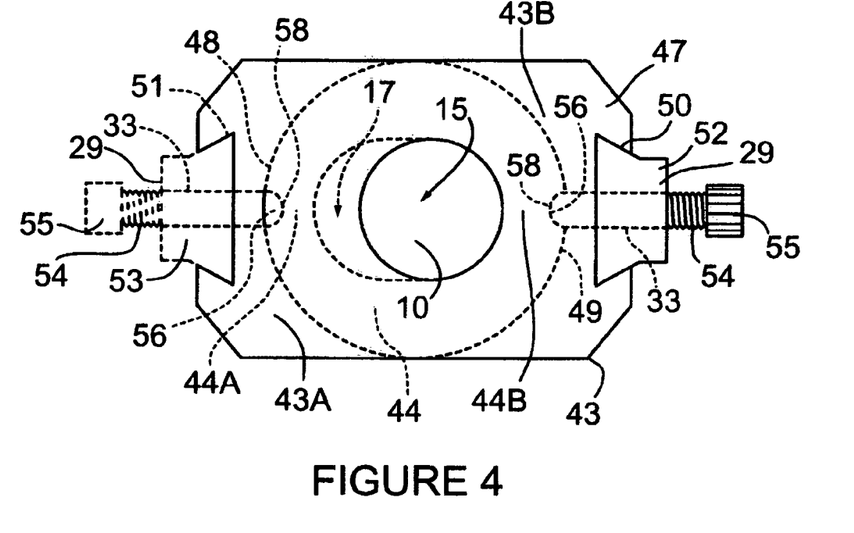
FIG. 4 is a top plan view of a second embodiment of the locking wedge system.
Figure 5:
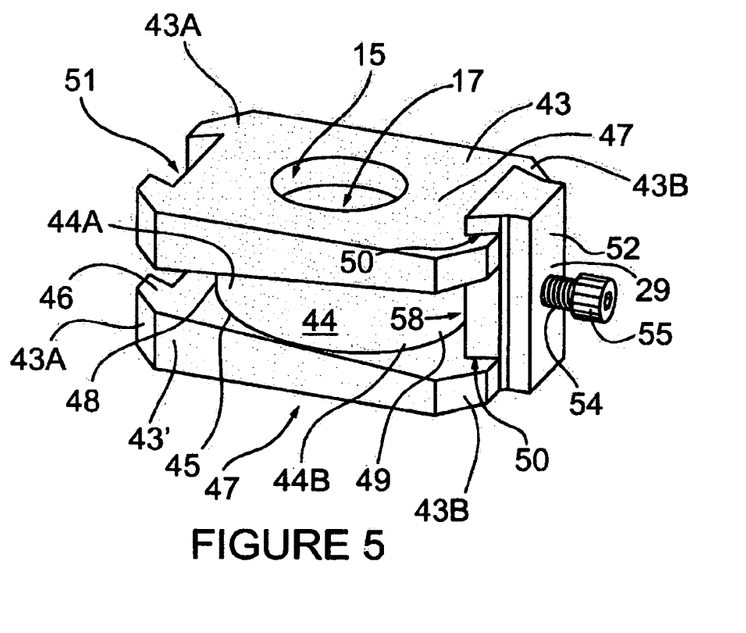
FIG. 5 is a perspective view of the locking wedge system of FIG. 4.

Turning to the FIGS. 4 and 5, in this second embodiment of the locking wedge system, tapered washers 43, 43' have shouldered locking recesses 50, to receive and contain locking push abutment 52, that slide longitudinally into the shouldered locking recesses 50 which straddle spaced tapered washers 43, 43' to position the threaded bore 33 in bridge portion 29 of the locking push abutment 52 in aligned relation with the centering recess 58 in thicker end face 49 of tapered wedge member 44 (shown in phantom in FIG. 4).

A locking jacking screw 54 (with rounded tip), in threaded relation through threaded bore 33 in bridge portion 29 of locking push abutment 52, has a rounded tip 56 that enters corresponding rounded locking centering recess 58, located in the thicker end face 49 of the tapered wedge member 44 to provide wedging action against the washers 43, 43'. It is to be understood that rounded tip 56 and corresponding rounded locking centering recess 58 are preferred but not necessary.

Conversely, tapered washers 43, 43' have shouldered unlocking recesses 51, to receive and contain threaded unlocking push abutment 53, that slide longitudinally into the shouldered unlocking recesses 51 which straddle spaced tapered washers 43, 43' to position the threaded bore 33 in bridge portion 29 of the unlocking push abutment 53 in aligned relation with the centering recess 58 in thinner end face 48 of tapered wedge member 44 (shown in phantom in FIG. 4).

An unlocking jacking screw 54 (with rounded end portion), in threaded relation through threaded bore 33 in bridge portion 29 of unlocking push abutment 53, has a rounded tip 56 that enters corresponding rounded unlocking centering recess 58, located in the thinner end face 48 of the tapered wedge member 44 to release or reduce the wedging action against the washers 43, 43'. It is to be understood that rounded tip 56 and corresponding rounded unlocking centering recess 58 are preferred but not necessary.

The pushing embodiments in FIGS. 4 and 5 have tapered washers 43, 43' with washer apertures 15 as in FIG. 1 and outer faces 47 which are usually normal to the polar axis of stud 10 as shown in FIG. 1. Tapered washers 43, 43' also have thinner ends 43B and thicker end 43A, similar to those shown in FIGS. 1, 2 and 3, with washer apertures 15 therebetween. Tapered wedge member 44 (with opposing rounded locking and unlocking centering recesses 58) has thinner end 44A and a thicker end 44B, with elongated wedge aperture 17 therebetween. Opposing faces 45 of wedge member 44 (of second or push embodiment) engage inner faces 46 of tapered washers 43, 43' of the second embodiment.

In order to ensure clear access for the axial sliding insertion and withdrawal of the abutments 52, 53, without the need to remove or loosen locknut 12, the tapered washers 43, 43' may be sized to extend radially outwardly beyond the locknut 12.

Locking and unlocking jacking Screws 54 have heads 55 which comprise any prior art means for rotating jacking screws 54, as do heads 20, 30 of FIG. 1. A hexagon recess in head 55 of the jacking screw 54 is readily accessed by an Allen Key in load applying action, or to unload the tapered wedge member when in the reversed location. In some circumstances screwdrivers with various tips may be used with a corresponding head 55.

Head 55 (and heads 20, 30) may also comprise outer parallel surfaces for rotating the jacking screw with a wrench. Those skilled in the art will recognize these and other appropriate means for rotating jacking screws 54, 20, 30. The use of a jacking screw embodiment in lateral pushing relation with the wedge member 44 may enable the use of a thinner tapered wedge member 44, and may be more rapidly assembled and disengaged in relation to the threaded stud 10 (not shown).

Figure 6:
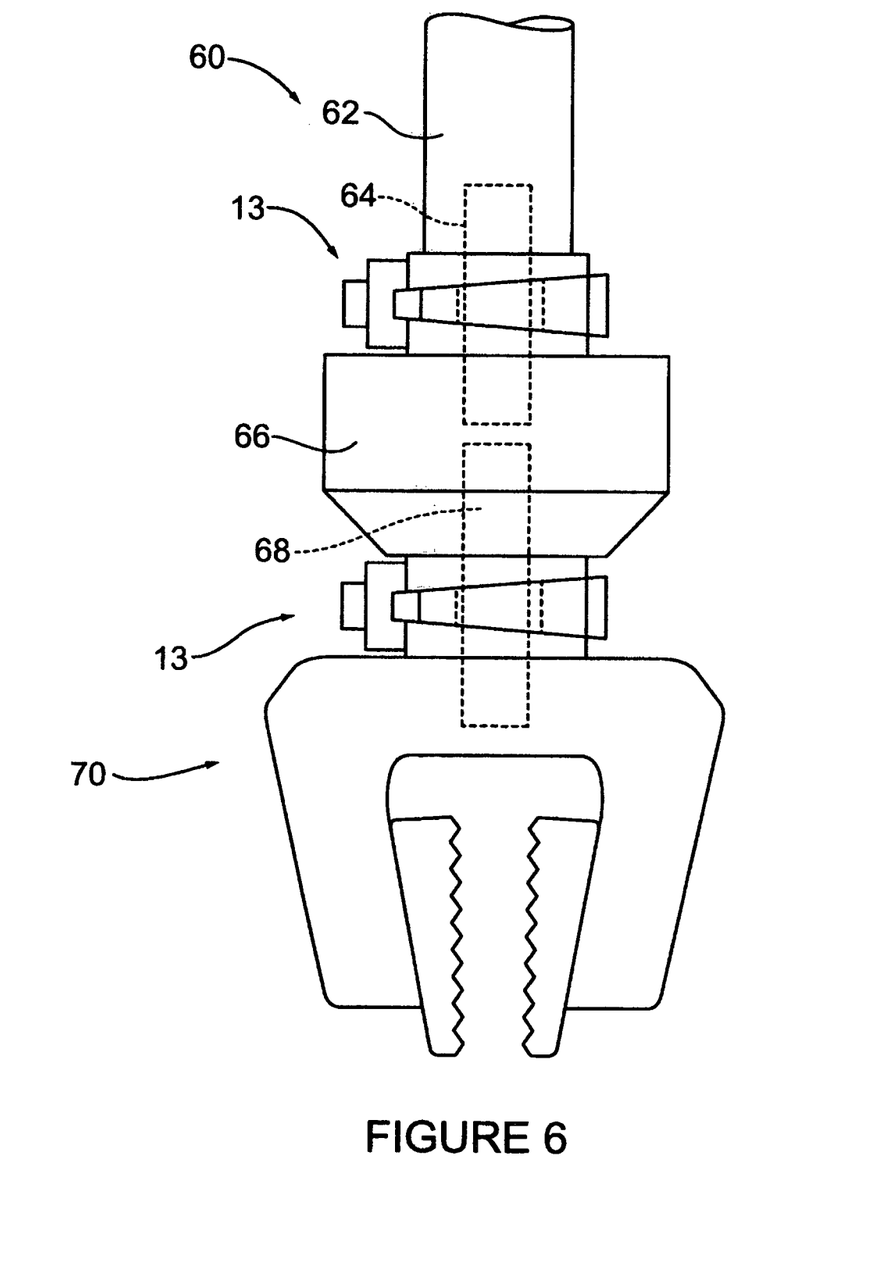
FIG. 6 is a side elevational view of a portion of a tensile testing machine incorporating two locking wedge systems of FIG. 1.

Referring to FIG. 6, this shows a portion of a tension load applying device 60, powered by the load shaft 62 of a hydraulic cylinder (not shown). The load shaft 62 is attached by way of a threaded first stud 64 (shown in phantom) to a load cell 66. A second threaded stud 68 (also shown in phantom) connects the load cell 66 to a set of gripping jaws 70. Mounted upon the stud 64 and interposed between the load shaft 62 and the load cell 66 is a first locking wedge system 13, as previously described. Mounted upon the stud 68 and interposed between the load cell 66 and the gripping jaws 70 is a second locking wedge system 13, as previously described. The threaded elements of FIG. 6 are assembled by hand, and screwed together, hand tight, so as not to apply any significant torque to the load cell. The respective locking wedge systems 13 are then adjusted, as described above, to apply a compressive reaction load to the adjoining components 62, 66, and 70, while correspondingly tensioning the studs 64 and 68. The tension load applied against the studs 64 and 68 is in excess of the planned tension loading to be applied by the load shaft 62 (and recorded by the load cell 66), so that the locked condition of the locking wedge systems 13 and the load applying device 60 will be maintained at all times during operation of the device 60.

Figure 7:
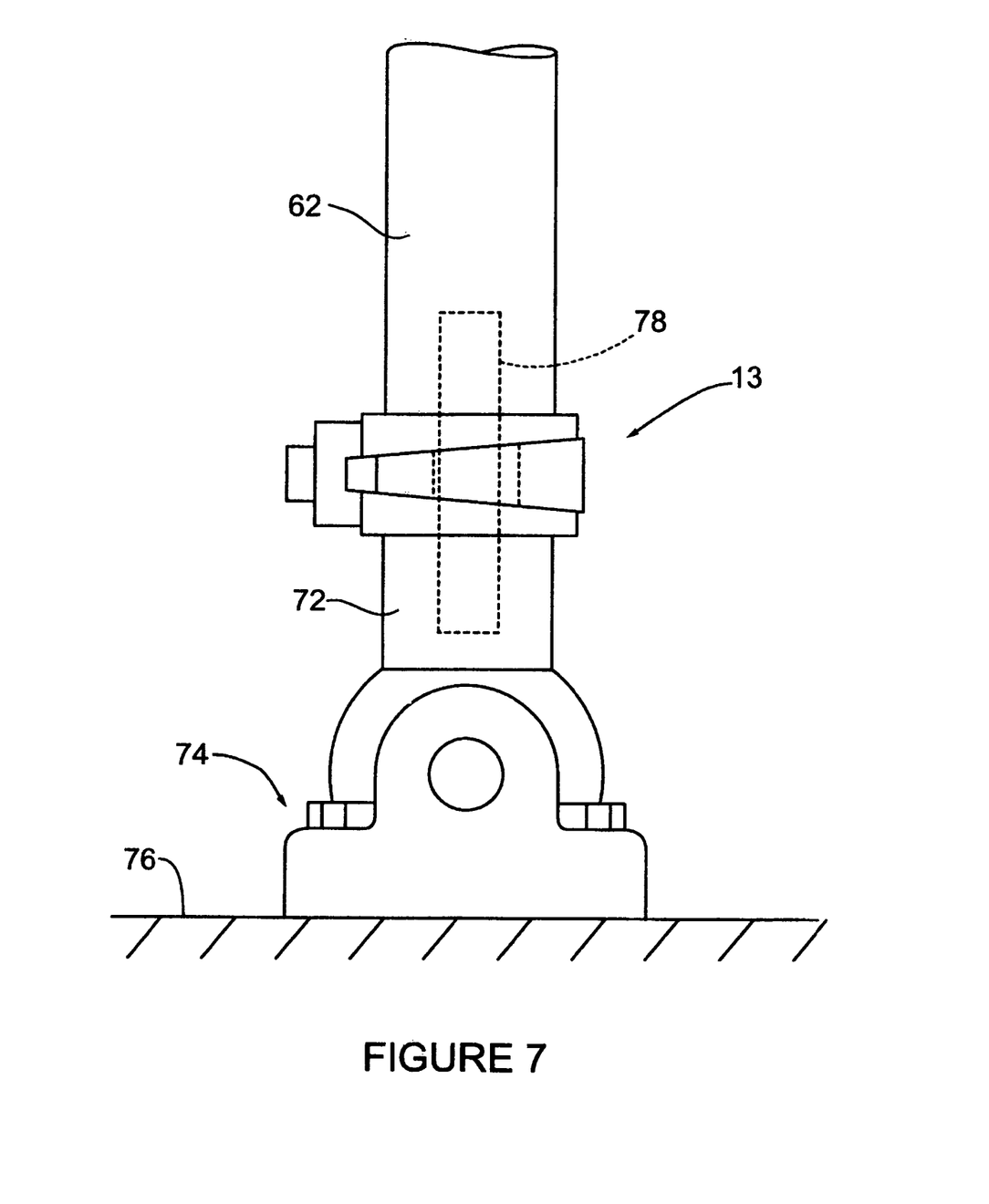
FIG. 7 is a side elevational view of a portion of a tensile testing machine having a pivotal attachment incorporating the locking wedge system of FIG. 1.

Referring to FIG. 7, a load shaft 62 of a hydraulic cylinder (not shown) is secured to the shaft 72 of a pivoted anchor 74 that is bolted to a test specimen 76. As in the case of the FIG. 6 embodiment, the shafts 62 and 72 are connected by way of a threaded stud 78 (shown in phantom), with a locking wedge system 13 in accordance with the invention interposed between the shafts 62 and 72. The threaded elements, with the locking wedge system 13 inserted in position, are screwed together until hand-tight, and the locking wedge system 13 is then adjusted so as to apply the desired level of tension to the stud 78. As in the case of the FIG. 6 components, the tension load applied against the stud 78 is in excess of the planned tension loading to be applied by the load shaft 62 so that the locked condition of the locking wedge system 13 and the load applying device 62 will be maintained at all times during its operation.

In this specification the term locking jacking screw means a threaded screw used to axially load the stud, and the term unlocking jacking screw means a threaded screw used to axially unload the stud. In the embodiments disclosed in FIGS. 1 to 3 locking jacking screw and unlocking jacking screw are identical (although they need not be) but are described separately in the detailed description for clarity. In the claims the term threaded screw means a locking jacking screw, an unlocking jacking screw or a locking and unlocking jacking screw as context requires. In the case where one of the first wedge angle and the second wedge angle is zero degrees then the end of the washer axially opposite the thinner end of the tapered washer shall also be considered the thinner end and the laterally opposite end shall be considered the thicker end, and the washer with the zero degree taper shall nonetheless be deemed a tapered washer in the claims.

Other embodiments incorporating the principles of the present invention will be recognized by those skilled in the art.

| Parts List | |
|---|---|
| 10 | threaded stud |
| 12 | lock nut |
| 12' | inner face of nut |
| 13 | locking wedge system |
| 14, 14' | tapered washers |
| 14A | thicker ends (of tapered washers) |
| 14B | thinner ends (of tapered washers) |
| 15 | washer aperture (of tapered washers) |
| 16 | tapered wedge member (for pulling) |
| 16A | thinner end (of tapered wedge member) |
| 16B | thicker end (of tapered wedge member) |
| 17 | wedge aperture (of tapered wedge member) |
| 18 | locking jacking screw |
| 20 | locking jacking screw head |
| 22 | threaded locking aperture (of tapered wedge member) |
| 22' | threaded unlocking aperture (of tapered wedge member) |
| 24 | locking pull abutment |
| 24' | outer surface of locking pull abutment |
| 25 | locking recesses |
| 26 | unlocking pull abutment |
| 26' | outer surface of unlocking pull abutment |
| 27 | unlocking recesses |
| 28 | foot portions (of abutment) |
| 29 | bridge portion (of abutment) |
| 30 | unlocking jacking screw |
| 31 | clearance bore (in bridge of pull abutment) |
| 32 | unlocking jacking screw head |
| 33 | threaded bore (in bridge of push abutment) |
| 40 | opposing tapered faces (of tapered wedge member) |
| 41 | inner faces of tapered washers |
| 42 | outer faces of tapered washers |
| 43, 43' | tapered washers (of second embodiment) |
| 43A | thicker end of tapered washers (with shouldered recesses) |
| 43B | thinner end of tapered washer (with shouldered recesses) |
| 44 | tapered wedge member with opposing centering recesses (for pushing) |
| 44A | thinner end (of tapered wedge member with centering recesses) |
| 44B | thicker end (of tapered wedge member with centering recesses) |
| 45 | opposing faces of tapered wedge member (of second embodiment) |
| 46 | inner faces of tapered washers (of second embodiment) |
| 47 | outer faces of tapered washers (of second embodiment) |
| 48 | thinner end face (of tapered wedge member) |
| 49 | thicker end face (of tapered wedge member) |
| 50 | shouldered locking recesses |
| 51 | shouldered unlocking recesses |
| 52 | locking push abutment |
| 53 | unlocking push abutment |
| 54 | jacking screw with rounded tip |
| 55 | head of jacking screw with rounded tip |
| 56 | rounded tip (of jacking screw of second embodiment) |
| 58 | centering recesses (in tapered wedge member of second embodiment) |
| 60 | tension load applying device |
| 62 | load shaft |
| 64 | first threaded stud (shown in phantom) |
| 66 | load cell |
| 68 | second threaded stud (in phantom) |
| 70 | gripping jaws |
| 72 | shaft (of pivoted anchor) |
| 74 | pivoted anchor |
| 76 | test specimen |
| 78 | threaded stud |
| W | threaded workpiece |
| W' | inner face of threaded workpiece |
| T | angle of taper |

I claim:

1. A locking wedge system for locking a first member to a second member in axially fixed spaced relation along a stud, at least the first member threadedly mounted on the stud, the system comprising:
   a pair of laterally tapered washers, each having a laterally tapered inner face facing the other tapered washer configured to be mounted in axially displaceable relation on the stud between the first member and the second member,
   a laterally tapered wedge member, having opposing tapered faces, configured to be mounted on the stud between the pair of tapered washers, each of the opposing tapered faces slidably engaging the inner face of one of the two tapered washers,
   the tapered wedge member being laterally displaceable relative to the stud and to the tapered washers,
   and a locking wedge displacer configured to laterally displace the tapered wedge member from an unlocked position wherein the stud is not axially tensioned to a locked position wherein the stud is axially tensioned,
   wherein the locking wedge displacer is configured to pull the tapered wedge member between the pair of tapered washers for increasing the axial tension on the stud.

2. The locking wedge system of claim 1 further comprising an unlocking wedge displacer for laterally displacing the tapered wedge member from a locked position wherein the stud is axially tensioned to an unlocked position wherein the stud is not axially tensioned, wherein the unlocking wedge displacer pulls the tapered wedge member out from between the pair of tapered washers for decreasing or releasing the axial tension on the stud.

3. The locking wedge system of claim 2 wherein the locking wedge displacer and the unlocking wedge displacer comprise one wedge displacer.

4. The locking wedge system of claim 3 wherein the wedge displacer comprises an abutment, the abutment for supporting a force transfer element for engaging the tapered wedge member for laterally displacing the tapered wedge member.

5. The locking wedge system of claim 4 wherein the abutment is secured by the pair of tapered washers.

6. The locking wedge system of claim 5 wherein each tapered washer comprises a shouldered recess for receiving the abutment, the abutment further comprising corresponding shoulders.

7. The locking wedge system of claim 4 wherein the force transfer element is a threaded screw.

8. The locking wedge system of claim 7 wherein the abutment is secured by the pair of tapered washers.

9. The locking wedge system of claim 8 wherein each tapered washer comprises a shouldered recess for receiving the abutment, the abutment further comprising corresponding shoulders.

10. The locking wedge system of claim 7 wherein the threaded screw is rotatably secured to the tapered wedge member and the threaded screw threadedly engages the abutment for moving the tapered wedge member in between and out from between the tapered washers in unison with the threaded screw.

11. The locking wedge system of claim 3 wherein the abutment is supported by the first member and the second member.

12. The locking wedge system of claim 2 wherein the unlocking wedge displacer comprises an abutment and a threaded screw, the abutment for rotatably supporting the threaded screw and the threaded screw for engaging the tapered wedge member.

13. The locking wedge system of claim 12 wherein a thicker end of the tapered wedge member comprises a lateral threaded unlocking aperture for engaging the threaded screw.

14. The locking wedge system of claim 12 further comprising a clearance bore in a bridge portion of the abutment through which the threaded screw extends, the threaded screw having an enlarged head supported by the bridge portion of the abutment.

15. The locking wedge system of claim 12 wherein the abutment is supported by the pair of tapered washers.

16. The locking wedge system of claim 15 wherein each of the pair of tapered washers comprises a recess for locating the abutment.

17. The locking wedge system of claim 2 wherein the abutment is supported by the first member and the second member.

18. The locking wedge system of claim 1 wherein the locking wedge displacer comprises an abutment and a threaded screw, the abutment for rotatably supporting the threaded screw and the threaded screw for engaging the tapered wedge member.

19. The locking wedge system of claim 18 wherein a thinner end of the tapered wedge member comprises a lateral threaded locking aperture for engaging the threaded screw.

20. The locking wedge system of claim 18 further comprising a clearance bore in a bridge portion of the abutment through which the threaded screw extends, the threaded screw having an enlarged head supported by the bridge portion of the abutment.

21. The locking wedge system of claim 18 wherein the abutment is supported by the pair of tapered washers.

22. The locking wedge system of claim 21 wherein each of the pair of tapered washers comprises a recess for locating the abutment.

23. The locking wedge system of claim 1 wherein one of the opposing tapered faces of the tapered wedge member and the corresponding inner face of one of the two tapered washers slidably engage at a first wedge angle and the other of the opposing tapered faces of the tapered wedge member and the corresponding inner face of the other of the two tapered washers slidably engage at a second wedge angle.

24. The locking wedge system of claim 23 wherein the sum of the first wedge angle and the second wedge angle is between two degrees and twenty degrees.

25. The locking wedge system of claim 24 wherein the first wedge angle is as low as zero degrees and the second wedge angle is as high as twenty degrees.

26. The locking wedge system of claim 23 wherein the first wedge angle and the second wedge angle are an identical wedge angle.

27. The locking wedge system of claim 26 wherein the identical wedge angle is between one and ten degrees.

28. The locking wedge system of claim 26 wherein the identical wedge angle is approximately three degrees.

29. The locking wedge system of claim 1 wherein the inner face of each of the tapered washers and the opposing tapered faces of the tapered wedge member comprise a friction reducing coating.

30. The locking wedge system of claim 1 wherein the tapered washers and the tapered wedge member are selectively rotatable about the stud, to facilitate access to the wedge displacer.

31. The locking wedge system of claim 1 wherein the abutment is supported by the first member and the second member.

32. A locking wedge system for locking a first member to a second member in axially fixed spaced relation along a stud, at least the first member threadedly mounted on the stud, the system comprising:
a pair of laterally tapered washers, each tapered washer having an inner face, mounted in axially displaceable relation on the stud between the first member and the second member, a laterally tapered wedge member, having opposing tapered faces, mounted on the stud between the pair of tapered washers, each of the opposing tapered faces configured to slidably engage the inner face of one of the two tapered washers,
the tapered wedge member being laterally displaceable relative to the stud and to the tapered washers,
and a wedge displacer configured to laterally displace the tapered wedge member from an unlocked position wherein the stud is not axially tensioned to a locked position wherein the stud is axially tensioned and configured to laterally displace the tapered wedge member from a locked position wherein the stud is axially tensioned to an unlocked position wherein the stud is not axially tensioned.

33. The locking wedge system of claim 32 wherein the wedge displacer comprises an abutment, the abutment for supporting a force transfer element for engaging the tapered wedge member for laterally displacing the tapered wedge member.

34. The locking wedge system of claim 33 wherein the force transfer element is a threaded screw.

35. The locking wedge system of claim 34 wherein the abutment is supported by the pair of tapered washers and a thinner end of the tapered wedge member comprises a lateral threaded locking aperture for engaging the threaded screw for locking the tapered wedge member and a thicker end of the tapered wedge member comprises a lateral threaded unlocking aperture for engaging the threaded screw for unlocking the tapered wedge member.

36. The locking wedge system of claim 35 further comprising a clearance bore in a bridge portion of the abutment through which the threaded screw extends, the threaded screw having an enlarged head supported by the bridge portion of the abutment, the threaded screw for pulling the tapered wedge member in between and out from between the tapered washers.

37. The locking wedge system of claim 32 wherein one of the opposing tapered faces of the tapered wedge member and the corresponding inner face of one of the two tapered washers slidably engage at a first wedge angle and the other of the opposing tapered faces of the tapered wedge member and the corresponding inner face of the other of the two tapered washers slidably engage at a second wedge angle.

38. The locking wedge system of claim 37 wherein the sum of the first wedge angle and the second wedge angle is between two degrees and twenty degrees.

39. The locking wedge system of claim 38 wherein the first wedge angle is as low as zero degrees and the second wedge angle is as high as twenty degrees.

40. The locking wedge system of claim 37 wherein the first wedge angle and the second wedge angle are an identical wedge angle.

41. The locking wedge system of claim 40 wherein the identical wedge angle is between one and ten degrees.

42. The locking wedge system of claim 40 wherein the identical wedge angle is approximately three degrees.

* * * * *